United States Patent Office 3,454,840
Patented July 8, 1969

3,454,840
ELECTROLYTE FOR ELECTROLYTIC CAPACITORS
Masaaki Hagihara, Hirakata-shi, Japan, and Shigeru Takimoto, Moriguchi-shi, Japan, assignors to Matsushita Electric Industrial Co. Ltd., Osaka, Japan, a corporation of Japan
Filed June 6, 1967, Ser. No. 644,009
Claims priority, application Japan, June 8, 1966, 41/37,432, 41/37,433; June 21, 1966, 41/40,856, 41/40,857
Int. Cl. H01g 9/00
U.S. Cl. 317—230         8 Claims

ABSTRACT OF THE DISCLOSURE

An electrolytic capacitor in which the capacitor elements contain an electrolyte which comprises ammonium trinitrophenolate as a solute and a solvent having the solute dissolved therein and contains no water, and which improves the conductivity of the electrolytic capacitors which has a great influence on the frequency characteristics, the high temperature load characteristics, the no-load characteristics, the low temperature characteristics, etc., of the capacitors.

---

This invention relates to electrolytic devices, and more particularly to an improved electrolyte for electrolytic capacitors.

An object of the present invention is to provide an electrolytic capacitor having a wide range of operating temperature from low to high temperatures.

Another object of the present invention is to provide an electrolytic capacitor of the kind above specified which is extremely stable in electrical characteristics, long in useful life and high in reliability.

A further object of the present invention is to provide an electrolytic capacitor having superior characteristics particularly useful at very elevated temperatures.

A particular object of the present invention is to provide a nonaqueous electrolyte for electrolytic capacitors for preventing chemical erosion of aluminium oxide on the aluminium electrode or other aluminium parts of the capacitor and suppressing evolution of gases caused by leakage current.

Figure 1:
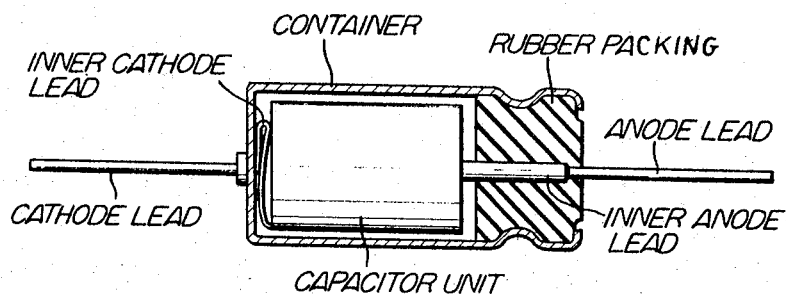

There are other objects and particularities of the present invention, which will be obvious from the following detailed descriptions with references to the accompanying drawings, in which:

FIG. 1 illustrates a typical form of conventional capacitor in which the present invention may be employed.

Figure 2:
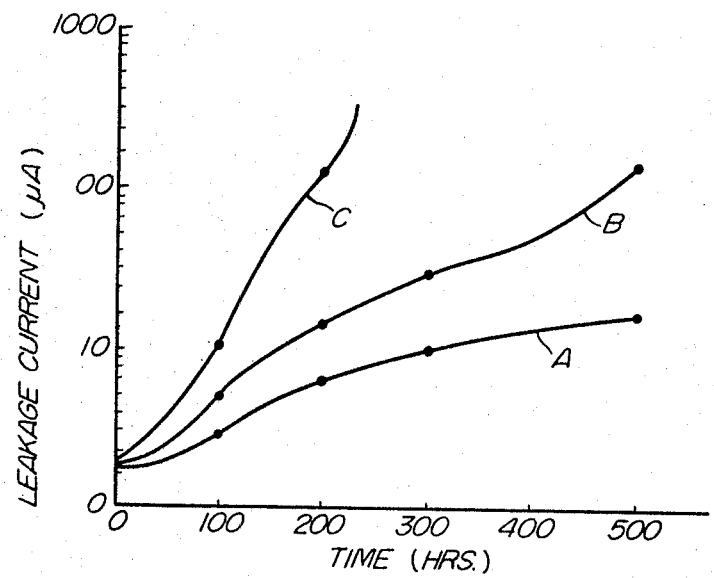

FIG. 2 graphically illustrates the deterioration of a capacitor caused by water in the electrolyte composition; the curve diagram shows the relationship between leakage current in high temperature shelf life tests and water content in the electrolyte.

Figure 3:
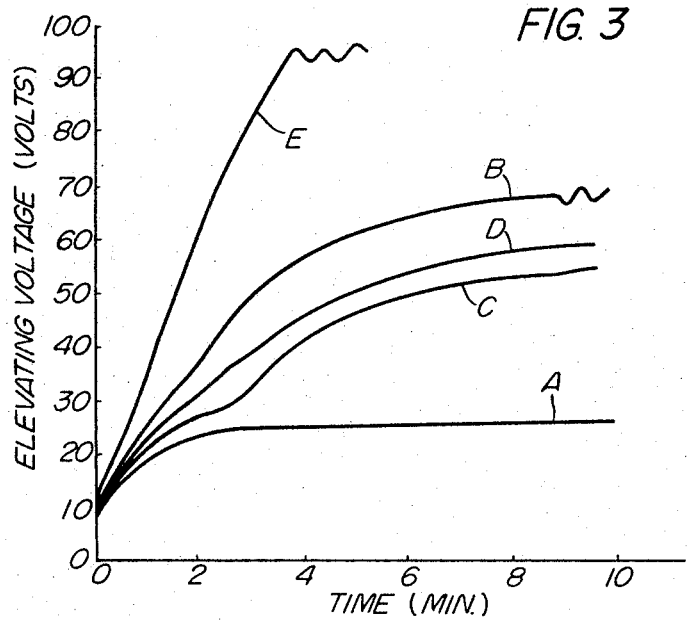

FIG. 3 graphically illustrates the forming characteristic of various electrolytes with respect to the present invention; the curve diagram shows elevation speed of voltage under a condition of constant current density.

Figure 4:
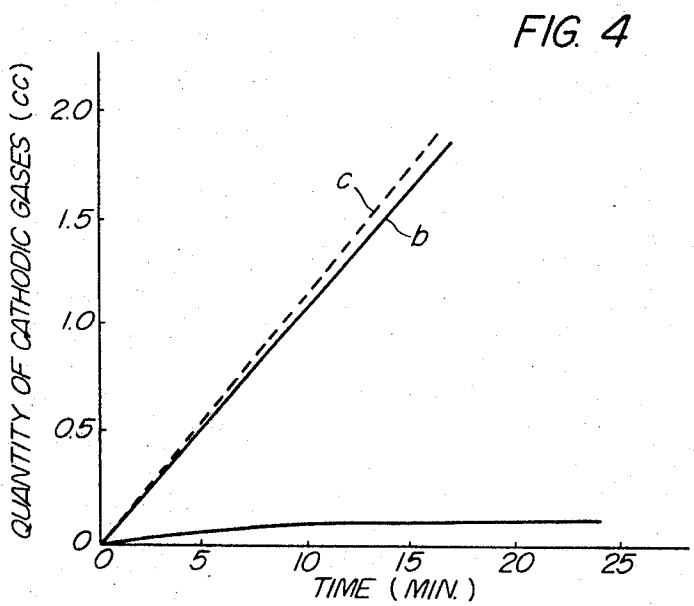

FIG. 4 graphically illustrates the peculiar property of electrolyte of the present invention, that suppresses evolution of gases on the cathode caused by leakage current.

Figure 5:
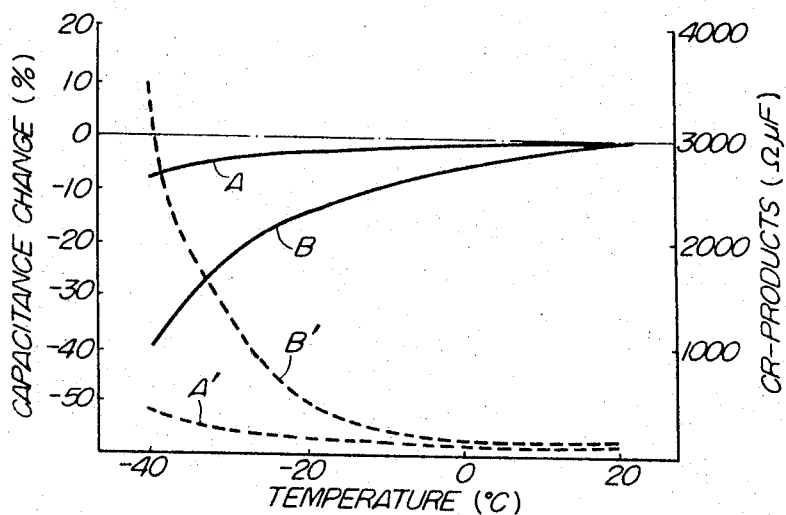

FIG. 5 graphically illustrates the low temperature characteristics of two kinds of electrolyte capacitors, one of which contains a kind of electrolyte of the present invention, the other of which contains a kind of well-known electrolyte.

Figure 6:
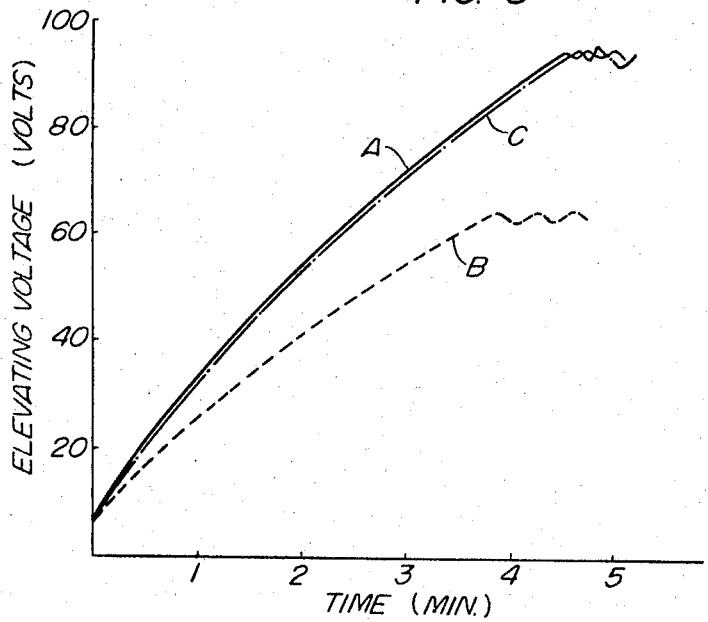

FIG. 6 graphically illustrates the effect improving the discharge characteristic by an addition agent of the new electrolyte.

In general, a so-called wet-type or dry-type electrolytic capacitor is fundamentally comprised of a metal anode having a thin film oxide formed on its surface by anodizing, a cathode and a so-called operating electrolyte which stands between them as an electric conductive medium. Electrolytic capacitors, which have such a peculiar structure in comparison with general capacitors are chemically sensitive, especially by the existence of the electrolyte and their characteristics, for a instance, temperature characteristics, frequency characteristics, and high temperature life characteristics etc., are governed especially by the electrolyte contained in them. This kind of capacitor has an important fault that the dissipation factor is large, while it is effected mainly by the resistance of the electrolyte, therefore apparently it seems to be possible to decrease it by making the conductivity of the electrolyte higher. However, in general, to make the conductivity high forces inevitably to increase chemical activity of the electrolyte, so that electrodes may become easy to be attacked chemically or electrochemically, the function as a capacitor may be deteriorated and the useful life may be short. Such a tendency appears more remarkably in the case selected with aluminium as the electrode and also in the low voltage capacitors. Consequently, the electrolyte is the most important element with respect to the characteristics of electrolytic capacitors and greatly effect the same.

As a result of the foregoing, consideration of the operating electrolyte has risen and the selection of it has been a very important problem. In the development of the operating electrolyte, we should research the points; (a) electrochemical (forming property, electrochemical attack to electrode), (b) chemical (reatcion between electrolyte and electrodes or parts attacked by electrolyte), or (c) physical (stability to temperature). So far the methods of development were too empirical to take great strides. Accordingly no satisfactory electrolytes for capacitor have yet been obtained.

The electrolytes comprised of polyhydric alcohols, for example, ethylene glycol, boric acid (or its salts), and water have been used as representative electrolytes since at the old and limited operating temperature range the characteristics are comparably stable and so they are widely used even recently. However there are faults that the deterioration becomes large at elevated temperatures, for a instance at 85° C., and the low temperature characteristics are not always good, when we adopt the electrolyte of this system. The main cause of the unstability at high temepratures may be ascribed to the chemical (or electrochemical) attack on the electrode by water and ions containing in the electrolyte, which is the essential weak point of such kinds of electrolytes. This fact might be testified by the result that such tendency decreased when we reduced the water content in the electrolyte.

FIG. 2 shows the relationship between water content in the electrolyte and leakage current at shelf life test. As is obvious from this figure, we find that by increasing water content in the electrolyte leakage current became greater, so that deterioration of capacitor was accelerated. As the result, to decrease water content is considered for a method with which high temperature characteristics are improved; really the method has been taken for this object. However as in the electrolyte of this system the conductivity is due to water contained, to decrease water content necessarily leads the increase in the dissipation factor of capacitors, so that makes the characteristics with respect to the factor deteriorate. On this, in order to improve the characteristics of an electrolytic capacitor higher, it becomes necessary to seek new nonaqueous electrolyte different from the old one, which contains no water essentially. As the result that we researched various nonequeous systems of electrolyte from this point of view, we could find new electrolytes which have extremely superior properties.

We will explain the details of the invention at a next step.

We have investigated properties, an operating electrolytes of a lot of nonaqueous electrolyte solutions which consisted of many electrolytes, above all, organic compounds and organic solvents. As the result, we could find that among the various electrolytes about which we examined, 2,4,6-trinitrophenol (picric acid) and it's salts are soluble in a large number of organic solvents and the solutions have high conductivity, chemical stability, good forming characteristics, and especially a very interesting suppressing action which reduces cathodic gas production caused by electrolysis. The present invention is found in the fundamental of the said facts and realized by the application of them.

2,4,6-trinitrophenol (hereafter, trinitrophenol) is one of the most dissociate organic acids, dissociation coefficient=$4.2 \times 10^{-2}$ in water and gives high conductivity in its soluble organic solvent as well as in water. For example, when we use dimethylformamide as a solvent, which is one of the good solvents, the solution gives maximum conductivity, coefficient $1.35 \times 10^{-2}$/cm., at 30° C. The value is very high in comparison with general nonaqueous electrolyte solutions and the height is good for low voltage capacitors. (less than 50 volts). When we use the electrolyte solution, trinitrophenol-dimethylformamide, as an operating electrolyte, one of the important problems is forming characteristics. FIG. 3 shows the characteristics of various electrolytes. The measurement was done with the method that the elevating voltage was measured under a constant current density, as applying voltage between anode and cathode of aluminum plain foils. The characteristic curve of the said electrolyte corresponds to curve A in FIG. 3. In this case the elevation curve stops between about 25 and 30 volts while this phenomenon is not always good for operating an electrolyte. However, when salts form, they have better properties; ammonium trinitrophenolate, potasium trinitrophenolate and trimethyl ammonium trinitrophenolate gives high conductivities in dimethyl formamide $1.45 \times 10^{-2}$, $1.30 \times 10^{-2}$, $1.26 \times 10^{-2}$ at 30° C. in turn, and the forming properties are better than it of the acid. They correspond to the curve diagram B, C, D in order. The results shows that ammonium trinitrophenolate has an excellent forming property as well as conductivity. However in the electrolyte solution voltage elevating speed falls in the range 50 to 60 volts and stops at 80 volts, discharging voltage. While in the case that we choose a mixed solvent dimethylformamide-ethylene glycol as a solvent of ammonium trinitrophenolate the forming property was further improved as shown in E in FIG. 3, and the voltage elevates up to 95 to 100 volts.

We have above explained that the trinitrophenol gave superior conductivity and excellent forming property in forms of salts and using suitable solvents. In the next place, we are going to show an interesting phenomenon found by us, that trinitrophenolate has an effective peculiarity for useful life of electrolytic.

We obtained FIG. 4 as the result of experiment that cm.²), using Pt plate as a anode and Al plate as a cathode in the two kinds of electrolyte solution (A) ammonium phenolate-dimethylformamide-ethylene glycol, solution (B) ammonium-petaborate-ethylene glycol and we measured the quantity of cathode gas. In FIG. 4, the curve $a$ corresponds to the case of solution (A); the curve $b$ to solution (B). The dotted line $c$ was drawn by the calculated value, in an assumption of the cathode reaction following Faraday's law and the current efficiency for hydrogen gas production being 100 percent. In this result, we should notice a differential between $a$ and $b$. That the curve $b$ nearly corresponds to line $c$ means the current efficiency to hydrogen gas production is nearly 100 percent. While in the solution (A) the efficiency was only a few percent. This interesting phenomenone is interpreted as the following in general electrolyte solution, following Equation 1 cathode reaction may go on and evaluate hydrogen gas:

$$2H^{2+} + e \rightarrow H_2 \qquad (1)$$

While, if in the same system there is a reductive reaction, shown by Equation 2 which takes prior to reaction 1, hydrogen gas may be prevented from being formed.

$$R + H^+ + e \rightarrow RH \qquad (2)$$

In our electrolyte solution, trinitrophenolate may work as R, and the reaction may follow Equation 3, and suppress hydrogen gas production. This interpretation might be proved by the fact that as the electrolysis goes on, electrolyte around the cathode varied the color from yellow to dark brown and 2-amino-4,6-dinitrophenolate was detected from the portion.

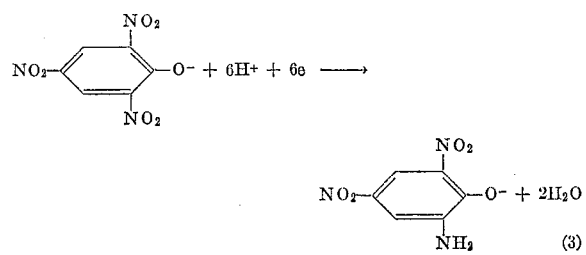

(3)

Now we often find a failure of capacitors that the sealing is destroyed by gas. The main cause of such a failure is well known to be due to cathode gases. From the theory of electrolyte capacitors, it seems impossible to make complete capacitors without leakage current. Consequently, gas evolution may not be able to be avoided more or less. However, on using the electrolyte of this invention even if capacitors have leakage current, gas evolution may be prevented by its ability and it may make the useful life extremely long. When electrolytes of our invention are used as an operating electrolyte it is desirable for the solution to contain a lot of trinitrophenolate as much as the conductivity does not drop, since it may be spent by leakage current.

We have explained superior characteristics of trintrophenolates, especially ammonium trinitrophenolate, as an operating electrolyte and its reasons. We will next illustrate some samples using this electrolyte for an operating electrolyte.

*Example 1*

We made two kinds of capacitor samples containing a new electrolyte and a conventional electrolyte. Capacitors were prepared by using an etched aluminum foil formed at 80 volts as an anode, a nonformed etched foil as a cathode, a porous paper spacer between them, winding them in layers, and impregnating them with electrolytes shown in Table 1, and sealed in containers

TABLE 1

| Electrolyte solutions | Composition | Conductivity (ʊ/cm.) |
|---|---|---|
| New electrolyte | Ammonium trinitrophenolate (20%), Dimethylformamide (34%), Ethylene glycol (46%) | $7.2 \times 10^{-3}$ |
| Well-known electrolyte | Boric Acid (6%), Ammonium water (8%), Ethylene glycol (86%) | $4.5 \times 10^{-3}$ |

The rated values of samples were 50 W.V., 50 mfd. Using these samples, we did high temperatures life test and shelf life test at 85° C.

The results were as follows; Table 2 shows the characteristics data of life test and Table 3 shows those of shelf life test.

TABLE 2

| | Initial | | | 1,000 hrs. | | | |
|---|---|---|---|---|---|---|---|
| | C | CR | LC | C | CR | LC | Appearance |
| (A) | 61.2 | 38.4 | 2.2 | 59.6 | 46.5 | 0.5 | Good. |
| (B) | 62.5 | 52.1 | 3.5 | | | | Sealing was broken between 100 and 200 hrs. |

NOTES:
C=Capacitance (mfd.).
CR=CR-product (mfd.).
LC=Leakage current (micro-A).

TABLE 3

| | Initial | | | 250 hrs. | | | |
|---|---|---|---|---|---|---|---|
| | C | CR | LC | C | CR | LC | Appearance |
| (A) | 61.5 | 39.0 | 2.0 | 61.2 | 36.2 | 4.3 | Good. |
| (B) | 61.8 | 50.2 | 4.2 | 72.5 | 87.7 | 356 | Rubber packing expanded. |

In the life test, samples containing our new electrolyte A completely operated and had very superior charactertistics after test, while samples containing well-known electrolyte B failed during test 100 hours' to 200 hours' operation, for sealing harmed by gas pressure.

In the shelf life test, the former operated completely during the test, however the latter shows large characteristics changes, especially increased the leakage current and gas evoluation.

Using the same kinds of samples, we measured low temperature characteristics. The results are graphically shown in FIG. 5. The capacitance changes (−40 vis. +25° C.)

was −8.4% in the former (corresponding to A in FIG. 5), and it was −38.5% in the latter (to B in FIG. 5). In the CR-products, the former was far smaller than the latter one; changes of them are 9 times in the former corresponding to A' in FIG. 5, on the contrary 61 times in the latter (to B' in FIG. 5).

As the results, we found how to make superior capacitors having a wide operating temperature range of −40 to +85° C.

*Example 2*

In spite of that the electrolyte, ammonium trinitrophenolate-dimethylformamide-ethylene glycol, has very excellent characteristics. It has a fault that discharge voltage drops from 95–100 volts to 60–70 volts by absorption of humidity in air. However we found a method to remove this fault which is to add a kind of addition agent, such as phosphoric anhydrate ($P_2O_5$). FIG. 5 shows the forming characteristics curve of said electrolytes and illustrates the remarkable effect of the addition agent. In FIG. 5 A corresponds to said electrolyte B to the electrolyte containing little water, and C to the electrolyte containing little water and 0.5% $P_2O_5$.

In order to know the real effect, we examined as follows: After leaving two kinds of said electrolyte without $P_2O_5$, and with 0.5% $P_2O_5$ open in air for several days, we made samples containing these electrolytes, and did life test at 85° C. with surge voltage applied (75 volts vis. 50 W.V.). In the test, samples containing $P_2O_5$ completely operated but samples without $P_2O_5$ failed by discharge. As the result, we can realize the effect of the addition agent.

Through the investigation of the addition quantity, it is decided that a range between 0.1 and 1 percent is most effective.

*Example 3*

By using ammonium trinitrophenolate as solute and ethylene glycol monoalkyl ether especially ethylene glycol monomethyl ether as a solvent, we could make an extremely superior electrolyte. We could not make a capacitor which operated at 125° C. even if we used the electrolyte shown in Example 1 or 2. While it became possible to make a capacitor operating at extremely elevated temperature at 125° C. with said electrolyte. And they also were good enough to operate even at very low temperature at −55° C.

We should refer to the representative example at next step.

Table 4 shows the components and characteristics of the representative system.

TABLE 4

| Composition | | Characteristics | | | |
|---|---|---|---|---|---|
| Electrolyte | Solvent | Conductivity (ʊcm.) | Discharge volts | Boiling point | Freezing point |
| Ammonium trinitrophenolate. | Ethylene glycol monomethylether. | $6.9 \times 10^3$ | 110 | +125° C< | −70° C.> |

We prepared a capacitor by impregnating with the electrolyte shown in Table 4 winding units using etched aluminum foil formed at 100 volts as anode. The rated values were 50 W.V., 50 mfd.

Using these samples, we tried high temperature characteristics test at 125° C., the results were as follows:

TABLE 5

| | Initial | | | 1,000 hrs. | | | |
|---|---|---|---|---|---|---|---|
| | C | CR | LC | C | CR | LC | Appearance |
| Life test | 36.8 | 28.5 | 2.2 | 35.4 | 65.0 | 0.1 | Good. |
| Shelf life test | 35.5 | 29.2 | 1.8 | 34.8 | 56.0 | 2.3 | Do. |

We measured the low temperature charcteristics. The data are shown in Table 6.

TABLE 6

| Temperature | +20° C. | | −20° C. | | −55° C. | |
|---|---|---|---|---|---|---|
| Characteristics | C | CR | ΔC | CR | ΔC | CR |
| | 35.2 | 32.3 | −3.8% | 110.2 | −9.6% | 650.4 |

NOTE.—Capacitance change (vis 20° C.).

By this example, it is apparent to realize capacitors having very superior characteristics and above all an extremely wide operating temperature range of −55 to 125° C.

*Example 4*

It was found out that we could further improve the electrolyte as shown in Example 3 with addition agents. As the addition agent, phosphorus pentoxide, calcium oxide and aluminium oxide were effective. The additional amounts were suitable each other in the range between 0.1 to 1% by weight. We made capacitors including the electrolyte containing 0.5% oxides and tested at 125° C. with working voltage applied.

TABLE 7

| Sample No. | Composition Basic comp. | Composition Addition agents | Initial C | Initial CR | 1,000 hrs. C | 1,000 hrs. CR | 2,000 hrs. C | 2,000 hrs. CR |
|---|---|---|---|---|---|---|---|---|
| 1 | Ammonium trinitrophenolate-ethylene glycol monomethyl ether | No | 110.5 | 58.5 | 98.6 | 258.2 | 92.6 | 580.0 |
| 2 | do | $P_2O_5$ | 112.3 | 56.3 | 108.6 | 73.2 | 106.2 | 105.5 |
| 3 | do | $Al_2O_3$ | 110.8 | 56.8 | 107.0 | 118.6 | 105.2 | 158.2 |
| 4 | do | CaO | 111.2 | 57.6 | 107.8 | 106.6 | 104.0 | 136.1 |

Each additions have remarkable effects to prevent the increasing of CR-product and changing of capacitance. The order of an effect is as follows: $P_2O_5 > CaO > Al_2O_3$.

The above description is the detail of the present invention. We have described the remarkable effects over and over again and it may not be necessary to refer to them further.

While it finally should be understood that the present invention is not limited thereto since others skilled in the techniques may somewhat modify the specific compositions set forth without going outside the scope of the inventive concept involved. Accordingly, appended claims are intended to cover all such equivalent variations as come within the true spirit and scope of the present invention.

What is claimed is:

1. An electrolytic capacitor comprising at least one aluminium electrode having a dielectric film formed thereon, and a nonaqueous liquid electrolyte which consists of ammonium trinitrophenolate and at least one solvent which can easily dissolve the electrolyte and is stable chemically and thermally.

2. The electrolytic capacitor according to claim 1 wherein the solvent is a mixed solvent which consists of dimethylformamide and ethylene glycol.

3. The electrolytic capacitor according to claim 1 wherein the solvent is an electrolyte solution of dimethylformamide and ethylene glycol, in which 0.1 to 1% by weight of phosphorus pentoxide is added for improving the discharge property.

4. The electrolytic capacitor according to claim 1 wherein the solvent is one of ethylene glycol monomethyl ethers.

5. The electrolyte solution for an electrolytic capacitor according to claim 1, the alkyl ether of which is ethylene glycol monomethyl ether.

6. The electrolyte solution for an electrolytic capacitor according to claim 5 which contains 0.1 to 1% by weight of phosphorus pentoxide.

7. The electrolyte solution for an electrolytic capacitor according to claim 5 which contains 0.1 to 1% by weight of calcium oxide.

8. The electrolyte solution for an electrolyte capacitor according to claim 5, which contains 0.1 to 1% by weight of aluminium oxide.

References Cited

UNITED STATES PATENTS 2,965,816  12/1960  Ross _____ 317—230

FOREIGN PATENTS 216,139  8/1924  Great Britain.
387,437  2/1933  Great Britain.

JAMES D. KALLAM, *Primary Examiner.*

U.S. Cl. X.R.

252—62.2